United States Patent [19]  [11]  4,212,057
Devlin et al.  [45]  Jul. 8, 1980

[54] SHARED MEMORY MULTI-MICROPROCESSOR COMPUTER SYSTEM

[75] Inventors: Charles L. Devlin, Ballston Lake; Charles W. Eichelberger, Schenectady, both of N.Y.

[73] Assignee: General Electric Company, Schenectady, N.Y.

[21] Appl. No.: 679,408

[22] Filed: Apr. 22, 1976

[51] Int. Cl.² .................. G06F 15/16; G06F 13/00; G06F 9/18
[52] U.S. Cl. ............................................... 364/200
[58] Field of Search ............... 340/172.5, 147 LP; 445/1; 364/200 MS File, 900 MS File

[56] References Cited

U.S. PATENT DOCUMENTS

| 3,445,822 | 5/1969 | Driscoll | 364/200 |
| 3,469,239 | 9/1969 | Richmond et al. | 340/172.5 |
| 3,505,651 | 4/1970 | Barlow et al. | 364/200 |
| 3,555,513 | 1/1971 | Hauck et al. | 364/200 |
| 3,560,934 | 2/1971 | Ernst et al. | 340/172.5 |
| 3,699,524 | 10/1972 | Norberg | 340/147 LP |
| 3,706,077 | 12/1972 | Takashi et al. | 340/172.5 |
| 3,735,360 | 5/1973 | Anderson et al. | 340/172.5 |
| 3,761,879 | 9/1973 | Brandsma et al. | 340/172.5 |
| 3,845,474 | 10/1974 | Lange et al. | 340/172.5 |
| 3,886,525 | 5/1975 | Brown et al. | 364/200 |
| 3,889,237 | 6/1975 | Alferness et al. | 340/172.5 |
| 3,896,418 | 7/1975 | Brown | 340/172.5 |
| 3,921,145 | 11/1975 | Emm et al. | 340/172.5 |
| 3,931,613 | 1/1976 | Gruner et al. | 340/172.5 |
| 3,940,743 | 2/1976 | Fitzgerald | 364/200 |
| 3,959,775 | 5/1976 | Valassis et al. | 340/172.5 |
| 3,982,231 | 9/1976 | Bernstein et al. | 364/200 |
| 4,000,485 | 12/1976 | Barlow et al. | 364/200 |
| 4,055,851 | 10/1977 | Jenkins et al. | 364/200 |

FOREIGN PATENT DOCUMENTS

1279955  6/1972  United Kingdom .................... 364/200

*Primary Examiner*—Melvin B. Chapnick
*Attorney, Agent, or Firm*—Geoffrey H. Krauss; James C. Davis; Marvin Snyder

[57] ABSTRACT

A multiprocessor microcomputer system having two or more substantially independent processors each of which has its own bus-type interconnection structure, and a shared memory accessible by any of the processors without interferring with the proper operation of the other processors. Controlled access to the memory by connecting the memory to the processor requesting access when only one such request is present and to the last processor to have received access when more than one request is received simultaneously allows autosynchronous operation, automatic selection of priority and high speed of operation.

9 Claims, 4 Drawing Figures

SHARED MEMORY MULTI-MICROPROCESSOR COMPUTER SYSTEM

BACKGROUND OF THE INVENTION

This invention relates, in general, to microcomputer systems and, more specifically, to a memory for use in a multiprocessor microcomputer system utilizing a bus interconnection structure.

Microcomputers are becoming increasingly important in a wide ranging variety of applications. As economies involved in the production of microprocessors and microcomputers continue to reduce the cost thereof, they will be utilized in more and more applications. It may often times be desirable to utilize more than one processing unit in conjunction with a single memory or a portion thereof. This may be desirable in order to divide the functions performed by a microcomputer among two or more processors in order to increase the capacity of the microcomputer system. Another advantage of a multiprocessor system is that lower cost may be achieved by enabling the implementation of a complex system with two or more relatively low cost processors as opposed to a single more complicated and consequently higher cost processor. A further advantage which may be obtained is that a system may be designed such that, in the event of failure of a single processor a second processor will assume the functions of the failed processor and thus provide a degree of redundancy not found in single processor systems. A still futher advantage attendant a multiprocessor microcomputer system is that communications may be established between two or more processors through a shared memory directly accessible to any processor. A system of this type has the capacity for sharing not only data but also programming information and has the further advantage of allowing one processor to control the programming of another by modifying the instructions stored in a single memory. Many microprocessors currently in use are organized according to a bus structure for communication between the microprocessor and the other components of the microcomputer system as, for example, memory and input/output devices. A bus interconnection structure allows the ready modification of a microcomputer system by the substitution of components therein without the need for physical modification of the basic system hardware. It is desirable, therefore, that a shared memory for utilization in conjunction with a multiprocessor microcomputer system be compatible with a bus-type interconnection structure.

SUMMARY OF THE INVENTION

These and other advantages and improvements in a multiprocessor microcomputer system are achieved in accordance with this invention. Briefly stated, and in accordance with one aspect of this invention, a multiprocessor microcomputer system is provided having two or more substantially independent processors each of which has its own bus-type interconnection structure, and a shared memory accessible by any of the processors without interfering with the proper operation of the other processors. In accordance with another aspect of this invention, a multiprocessor shared memory microcomputer is provided wherein one processor is designated a priority processor and is allowed access to the shared memory on a priority basis without interfering with the proper operation of the other processors. The types of microprocessors used in conjunction with a shared memory of the type with which this invention mainly is concerned often times operate in a mode which actively utilizes an associated memory for only a portion of the time, typically in accordance with a clock waveform wherein actual connection to memory is required during only a certain phase of the clock. A shared memory in accordance with this invention enables two microprocessors to utilize a shared memory in a fashion providing extremely efficient use of a single memory by two or more processors. A feature of certain memories in common use is that they are able to respond to requests for service from a microprocessor faster than the processor is able to utilize the service. For example, data can be written into or read out of a memory faster than certain microprocessors are able to perform the reading or writing operations. Accordingly, there is provided by this invention means for increasing the efficiency of memory utilization by enabling a single shared memory to provide service to two or more processors such that the time during which one processor does not require service is dedicated to the other. In this way a substantial amount of time during which memory was previously inactive and, therefore, wasted is efficiently utilized.

In accordance with still another aspect of this invention, a shared memory is provided which may, if desired, appear to each of the two or more processors sharing it to be a different section of the total memory capability of the processor. For example, assume that each of two processors has the capability to address 64,000 memory addresses. Assume still further that shared memory is provided in accordance with this invention to the extent of 8,000 addresses. In accordance with a feature of this invention, the 8,000 shared addresses might appear as addresses 0 through 7,999 to a first processor and 8,000 to 15,999 to a second processor. Where desired, of course, the shared memory may be the same addresses for two or more processors.

BRIEF DESCRIPTION OF THE DRAWING

The features of the invention which are believed to be novel are pointed out with particularity in the appended claims. The invention itself, however, both as to its organization and method of operation together with further objects and advantages thereof may best be understood by reference to the following description taken in connection with the accompanying drawings in which:

DESCRIPTION OF THE PREFERRED EMBODIMENTS

Figure 1:
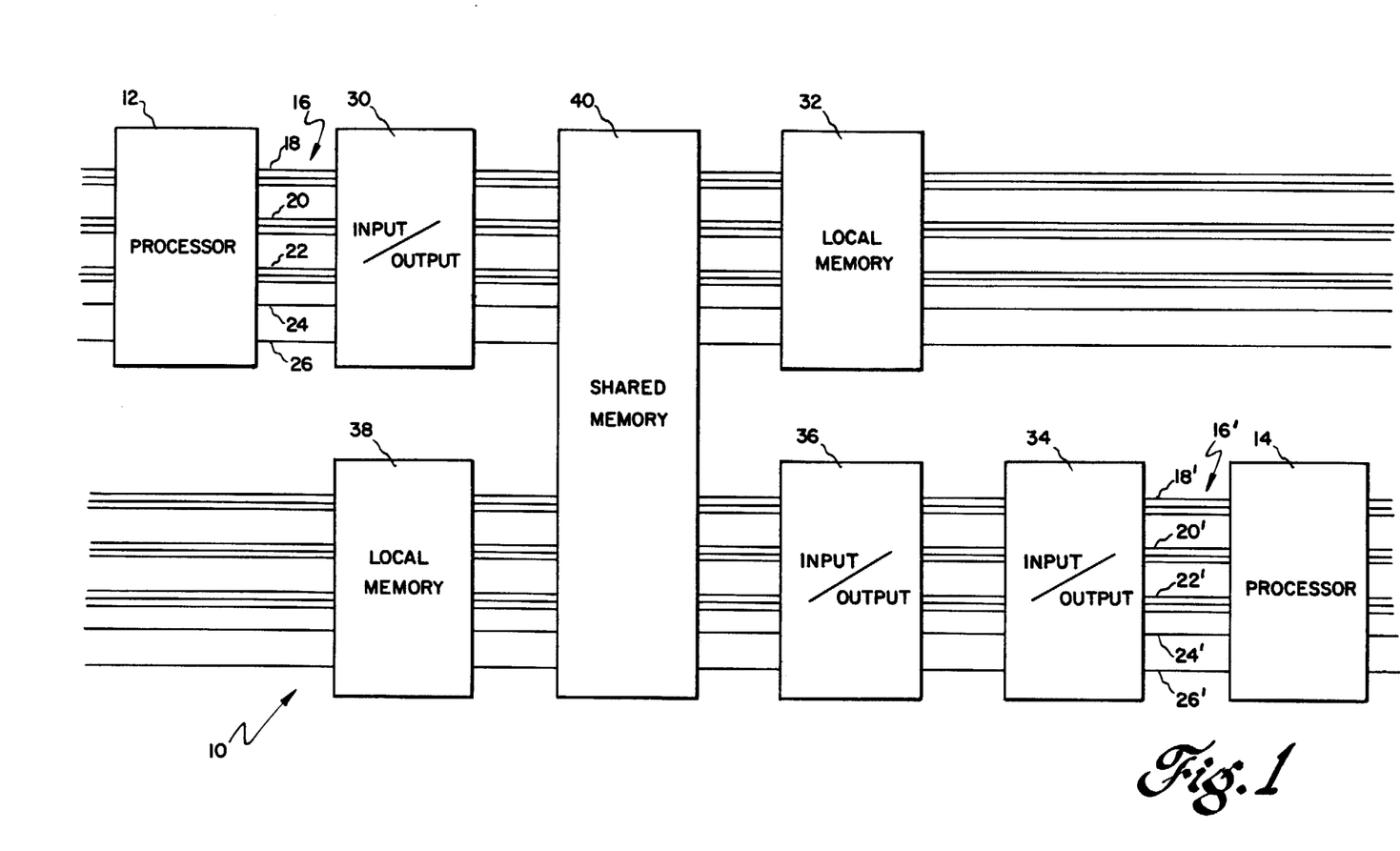
FIG. 1 is a block diagram of a multiprocessor microcomputer in accordance with this invention wherein memory is shared between two or more processors.

A two processor microcomputer including a shared memory in accordance with this invention is illustrated in block diagram form at FIG. 1. The computer, designated generally at 10, includes first processor 12 and second processor 14. It is to be understood that while this invention will be described in conjunction with FIG. 1 with respect to a multiprocessor microcomputer having two processors, that those skilled in the art will readily appreciate that two, three or more processors may readily be employed with a single shared memory in accordance with the teachings of this invention. Processor 12 has associated therewith a first bus structure generally designated at 16 which includes: an address bus 18, a data-out bus 20, a data-in bus 22, a read/write control bus 24 and a wait bus 26. It will be appreciated by one skilled in the art that while the read/write control bus and wait bus are illustrated as single wires and the address and data buses are illustrated as three wires that the precise configuration of the buses will vary depending upon the type and number of signals required to be transmitted along the buses. For example, it is often times convenient to provide parallel address data inputs and outputs including as many as 16 bits. It will be appreciated that the address bus will contain a sufficient number of distinct electrical connections to supply the requisite number of bits. Similarly, the data-out and data-in buses may contain, for example, 8 bits of parallel format information each and will therefore require 8 conductor buses for each of the data-in and data-out buses. The read/write and wait buses may readily be accomplished utilizing only one electrical conductor referenced to ground or, alternatively, two or more conductors as desired. The specific form taken by the sundry buses depends upon the organization of the processor and related ancillary equipment utilized in accordance with this invention. Although not illustrated, it will be appreciated by those skilled in the art that additional busses may be provided in accordance with particular embodiments of this invention. For example, although not illustrated, power supply buses are understood to be included in the microcomputer system 10 of FIG. 1.

A second set of buses substantially identical to buses 18 through 26 is associated with second processor 14. These buses, 18', 20', 22', 24' and 26' correspond to buses 18 through 26 associated with processor 12. Each of processors 12 and 14 and the associated bus structures thereof is associated with certain peripheral components. Processor 12 is connected via bus structure 16 to input/output device 30 and to local memory 32. Processor 14 and its associated bus structure 16 are connected to input/output device number 34, input/output device 36 and local memory 38. It is to be understood that the connection between the processors and the associated equipment hereinabove described is conventional and will not, therefore, be described at great length herein. Briefly, the address buses 18 and 18' are supplied by the processors 12 and 14, respectively, with address information which is supplied to each device connected to the bus structure. The address present at any given time on the address bus will correspond to a particular address in a particular device and access will be gained to that device and to the particular location in the device to which the address corresponds. For example, a particular 16 bit address may correspond to a certain location in memory. Whenever the particular combination of bits appears on the address line that location in memory will be available to the processor. Buses 20 and 22 along with corresponding buses 20' and 22' are the data input and output buses. These buses provide paths between the devices for data to be transferred from one device to another. The data input and output buses carry the actual data between devices. For example, data may be written into or read from memory by providing a memory address on the address bus and providing data from the processor onto the data-out bus from which it is received by the addressed device. It will be appreciated that it may be required to supply to the memory further signals as exemplified by signals of the type carried by the read/write buses 24 and 24' before data can be entered into or recovered from memory or other device. Wait buses 26 and 26' provide signals from device requesting service when the device from which service is requested is unable to comply with a request. For example, if data is being supplied to an input/output device from a processor, it will often times be the case that the processor is able to supply the data at a speed greater than that at which the input/output device can utilize it. In order to prevent data from being lost, a wait signal is sent to the processor to moderate the rate of data flow from the processor to the input/output device to an extent that the data is supplied at a rate at which the input/output device can accept it. This same relationship may exist between any two devices when the speeds at which they are able to perform various operations are different. In addition to the devices hereinabove described, microcomputer 10 includes shared memory 40. Shared memory 40 is connected to the bus structures associated with both processor 12 and processor 14. In accordance with a presently preferred embodiment of this invention shared memory 40 includes a single memory accessible to both processor 12 and processor 14. It is a feature of this invention that shared memory 40 may appear to each of the processors to be a different portion of the total memory accessible by each processor.

Figure 2:
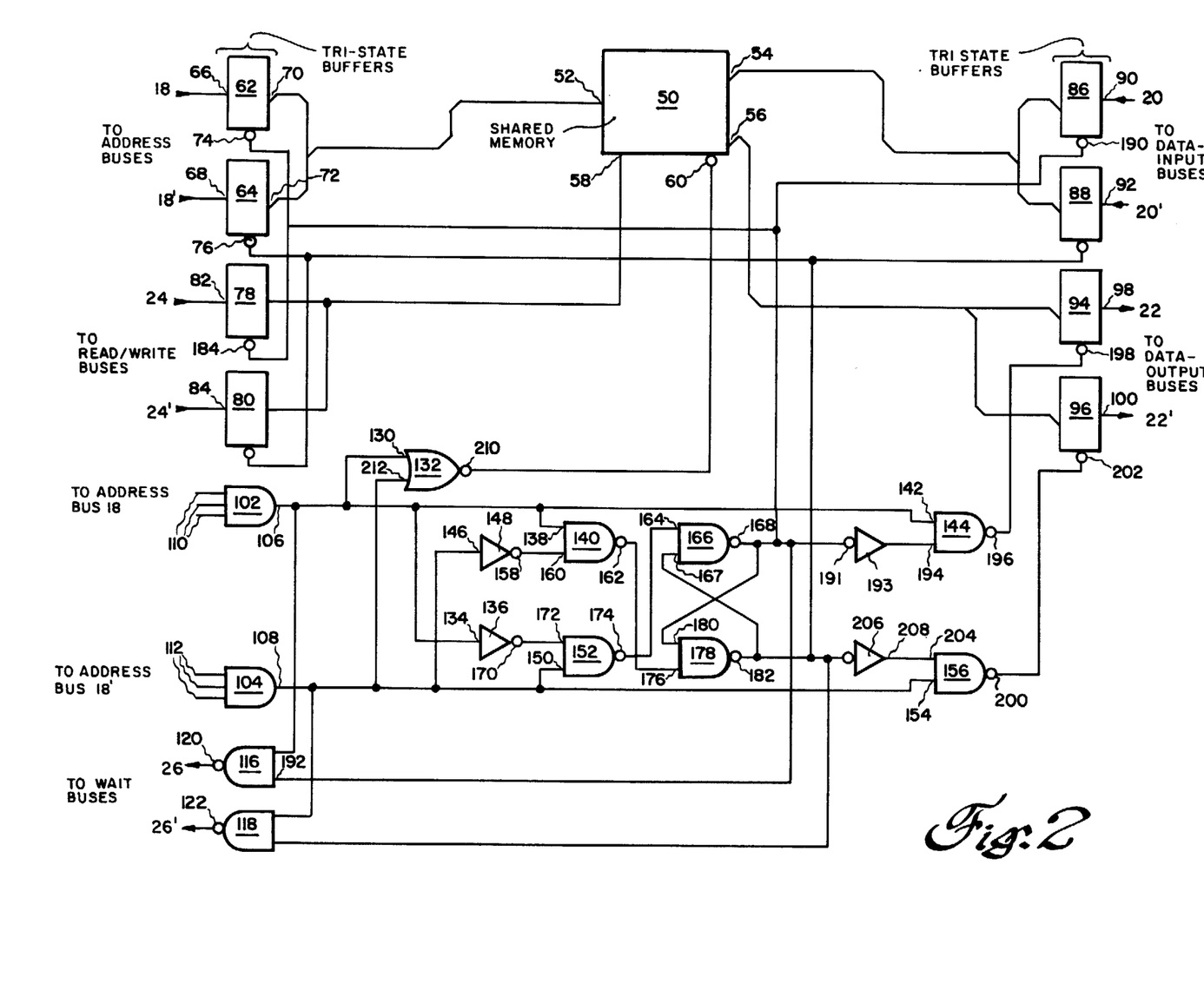
FIG. 2 is a detailed logical schematic diagram of a shared memory for utilization with two processors in accordance with a presently preferred embodiment of this invention.

An exemplary shared memory in accordance with a presently preferred embodiment of this invention is illustrated at FIG. 2. A memory 50 which may advantageously be a random access memory is provided having an address port 52, a data-in port 54, a data-out port 56, a read/write control port 58 and a memory enable port 60. As was hereinabove described in conjunction with the discussion of FIG. 1, each of the aforementioned address, data-in, data-out, read/write and memory enable ports may include one or more physical connections. Address port 52 of memory 50 is connected to tri-state buffers 62 and 64. Buffers 62 and 64 provide selective connection between the address port 52 of memory 50 and the appropriate address buses associated with the two processors accessing the memory. In accordance with this invention, the shared memory module of FIG. 2 may readily be employed in conjunction with a microcomputer structure of the type illustrated at FIG. 1 and the discussion hereinafter appearing will assume that the shared memory of FIG. 2 corresponds to shared memory 40 of FIG. 1. Accordingly, tri-state buffers 62 and 64 are connected to address buses 18 and 18' of FIG. 1. It will be appreciated that while tri-state buffers 62 and 64 are illustrated as single blocks, that multiple blocks are employed as required in order to accommodate multiple address connections. Tri-state buffers 62 and 64 are characterized by input terminals 66 and 68 respectively and output terminals 70 and 72. Tri-state buffer 62 is provided with gate input terminal 74 which in this particular embodiment of the invention is an inverting input terminal, that is to say one which activates tri-state buffer 62 when a ground or logical zero signal is applied thereto. Corresponding gate input terminal 76 is provided at tri-state buffer 64. Tri-state buffers 62 and 64 provide selective connection between inputs 66 and 68 and outputs 70 and 72. When a logical zero level signal is applied to gate input terminal 74, for example, a low impedance electrical connection is provided between input 66 and output 70. When gate terminal 74 is provided with a positive voltage, a logical one, no connection is provided between input 66 and output 70 and output 70 is permitted to float, that is is not connected to either a zero or a plus signal but rather is left in a substantially unterminated state. The operation of tri-state buffer 64 is identical. The function of tri-state buffers 62 and 64 may be readily visualized by analogy to an electrical relay of the single pole, single throw type wherein input and output terminals 66 and 70 are the contacts of the relay and gate terminal 74 provides connection to the coil of the relay. It will be appreciated by those skilled in the art that the function of tri-state buffers 62 and 64 might be provided in a variety of fashions and this invention is not intended to be limited to any particular method or apparatus for obtaining the function hereinabove described. For example, tri-state buffers such as the 8216 or 8226 manufactured by Intel Corp., Santa Clara, California may be utilized.

Additional tri-state buffers 78 and 80 provide selective connection to read/write input 58 of memory 50 from read/write inputs 82 and 84 respectively. Tri-state buffers 86 and 88 similarly provide connection to data-in port 54 from inputs 90 and 92 while buffers 94 and 96 provide connection from data-out port 56 of memory 50 to output terminals 98 and 100. It will be understood that as was the case with buffers 62 and 64 that buffers 78, 80, 86, 88, 94 and 96 may provide more than a single electrical connection to the appropriate buses. It will be appreciated that the nature of the buffers permits direct connection to the appropriate buses of the microcomputer systems. For example, buffer 62 is connected to bus 18, buffer 64 to bus 18', buffer 78 to bus 24, buffer 80 to bus 24', buffer 86 to bus 20, buffer 88 to bus 20', buffer 94 to bus 22 and buffer 96 to bus 22'. The shared memory of FIG. 2 further includes AND gates 102 and 104 which are adapted in accordance with this invention to be connected to that portion of buses 18 and 18' which carry the high order address bits. Those skilled in the art will appreciate that the address bus will carry a plurality of address bits in binary form. Visualizing the address data in parallel form, it will be appreciated that in the case wherein memory 50 includes a number of addresses smaller than the total number of addressable addresses by the processor that the higher order address bits will not be required in order to uniquely specify an address in memory 50 alone. They will, however, be necessary to distinguish the block of memory addresses represented by memory 50 from the remaining memory addresses accessible by the processor. Accordingly, the higher order address bits are applied to AND gates 102 and 104 which provide signals at outputs 106 and 108 thereof when memory 50 is addressed. Each of AND gates 102 and 104 includes a plurality of inputs 110 and 112, the precise number of which will differ depending upon the relative size of memory 50 and the addressing capability of the processor. As AND gates 102 and 104 provide outputs when each of the inputs thereof is at a high logic level, it will be appreciated that memory 50 will be accessed when the respective processor addresses the portion of memory having the highest address location. For example, wherein 16 bits are provided by the processor to the address bus and further wherein memory 50 includes, for example, 8000 addresses and further wherein the 8000 addresses are the highest 8000 addresses addressable by the processor, and still further that the 8000 addresses represent one-eighth of the total number of addresses addressable by the processor, then three binary bits are required to uniquely determine which of eight blocks of memory is addressed. Accordingly, in the embodiment of this invention illustrated at FIG. 2, the three highest order address bits are applied to inputs 110 of AND gate 102 and an output is produced at output 106 thereof when each of inputs 110 is high. It will be appreciated that any of the seven other blocks of memory will produce at least one bit at input 110 of AND gate 102 which is zero or low and no output will be produced at output 106. Where it is desired in accordance with this invention to address other than the highest group of memory addresses, inverters may be utilized between the high order portion of the address bus and AND gate 102 in order to provide an input at input 110 thereof which comprises three logical ones. It will be appreciated, therefore, that memory 50 may appear to the processor to be any of a number of blocks of memory locations. Further, gates 102 and 104 may be configured so that memory 50 appears to each of processors 12 and 14 to be a different portion of the memory addressable by the respective processors. For example, assume that three bits of address data are supplied to each of gates 102 and 104 and assume further that each of the bits applied to gate 104 is inverted before being connected to inputs 112 thereof. It will be appreciated that gate 104 will provide an output signal at output terminal 108 thereof whenever each of the high order address bits is zero rather than one and that memory 50 will appear to processor 14 to be the lowest 8000 memory addresses and to processor 12 to be the highest 8000 memory addresses.

NAND gates 116 and 118 provide the final connection to the bus structure of two processors at outputs 120 and 122 thereof, respectively. Output 120 is connected to wait bus 26 and output 122 to wait bus 26'. The shared memory of FIG. 2 may be seen to be connected only to the bus structures of the two portions of the multiprocessor microcomputer of FIG. 1. No additional control is required and no direct connection is made between the two bus structures.

The operation of the shared memory of FIG. 2 requires that a number of conditions be satisfied. Memory 50 may be addressed by either of processors 12 or 14 but may not be simultaneously addressed by both. When only one processor addresses the memory, the shared memory of FIG. 2 gives access to that processor. When both processors simultaneously require access to the memory that processor which most recently utilized the memory is given access. It will be appreciated that a request for service by a processor will be evidenced by a high output at either of outputs 106 or 108 of gates 102 and 104. For purposes of discussion, reference will be made to "high" and "low" signals. It will be understood that these references are to high and low logic level signals and do not necessarily refer to specific relative magnitudes. Those skilled in the art will recognize that high and low respectively refer to logical ones and zeros. Assume first that only output 106 of AND gate 102 is activated to produce a high signal thereat indicating that a processor 12 desires access to the memory. A high signal appears at output 106 of AND gate 102 and simultaneously at input 130 of NOR gate 132, input 138 of NAND gate 140 and input 142 of NAND gate 144. Since no service is being requested by processor 14 output 108 of AND gate 104 is low providing a low signal to: input 146 of inverter 148, input 150 of NAND gate 152 and input 154 of NAND gate 156. Inverter 136 provides a low signal to input 172 of NAND gate 152, output 174 of which will necessarily be high. Output 174 of NAND gate 152 is connected to input 164 of NAND gate 166 and provides a high signal thereto. Since input 146 of inverter 148 is low, output 158 thereof provides a high signal to input 160 of NAND gate 140. Since input 138 of NAND gate 140 is also high, output 162 thereof is low providing a low signal to input 176 of NAND gate 178 which insures that output 182 thereof is high. Output 182 is connected to input 167 of NAND gate 166 and since both inputs 164 and 167 are high, output 168 of NAND gate 166 is low providing a low signal to gate inputs 74 and 184 of tri-state buffers 62 and 78, respectively. Low logic signals are similarly provided to input 190 of tri-state buffer 86 and to input 192 of NAND gate 116 which provides a high signal at output 120 thereof. It will be recalled that NAND gates 116 and 118 are connected to the wait buses associated with processors 12 and 14, respectively. In accordance with this invention, a low signal will cause the processor to wait and a high signal will allow it to proceed. Accordingly, it will be appreciated that tri-state buffer 62 provides connection between input 66 thereof and output 70 thereby connecting address bus 18 to input 52 of memory 50. Similarly, input 82 of tri-state buffer 78 is connected to input 58 of memory 50 and input 90 of tri-state buffer 86 is connected to input 54 of memory 50. Thus, the appropriate address, read/write and data buses are connected to the memory. The selective activation of the memory for either accepting or providing data therefrom will be described hereinbelow.

The operation of the shared memory of FIG. 2 when service is required by processor 14 alone is similar to that hereinabove described and produces a low signal at output 182 of NAND gate 178 thereby activating tri-state buffers 64, 80 and 88 to provide connection to memory 50 of inputs 68, 84 and 92. The operation of the shared memory when service is simultaneously required by both processors 12 and 14 depends upon which processor has most recently had access to the memory. Assume that prior to the simultaneous request for services that a processor 12 has most recently addressed the memory. Output 168 of NAND gate 166 will provide a low signal while output 182 provides a high signal. Assume now that both AND gates 102 and 104 provide log signals indicating that neither processor requires service. A low signal is provided to NAND gate 140 while a high signal is provided to input 164 of NAND gate 166. Since input 167 of NAND gate 166 is connected to output 182 of NAND gate 178 which, it will be recalled, is providing a high signal, NAND gate 166 will remain in its previous state and produce a low signal at output 168 thereof. This low signal is connected to input 180 of NAND gate 178 assuring that a high signal continues to be produced at output 182 thereof. It will be seen that NAND gates 166 and 178 are connected in a flip-flop circuit relationship and will maintain a low and high signal, respectively, at the output thereof in the absence of service requests from either processor. Assume now that both processors require service. Both outputs 106 and 108 will be high thus providing high signals to inverters 136 and 148 which will, therefore, produce low signals at outputs 158 and 170, thereof, respectively, which low signals will insure that high signals are produced at outputs 162 and 174 which are coupled to inputs 176 and 164, respectively. It will be recalled that NAND gate 166 was previously in an "on" state producing a low signal at output 168 thereof and that NAND gate 178 was producing a high signal at output 182 thereof and it will be appreciated that these conditions will continue during the simultaneous request for service by both processors. The inputs to NAND gate 166 remaining high and inputs 180 and 176 of NAND gate 178 being low and high, respectively, thus producing a high output at output 182 of NAND gate 178.

Assume now that request is made only by processor 14 and that therefore output 106 is low and output 108 is high. High signals are applied to inverter 148 and input 150 of NAND gate 152. Low signals are applied to inverter 136 and input 138 of NAND gate 140. NAND gate 140 consequently produces a high signal at output 162 thereof while NAND gate 152 produces a low signal at output 174 thereof. The low signal appearing at output 174 of NAND gate 152 is connected to input 164 of NAND gate 166 which produces a high signal at output 168 thereof which is connected to input 180 of NAND gate 178. Since output 162 of NAND gate 140 is connected to input 176 of NAND gate 178, output 182 thereof changes to a low state and processor 14 is given access to the memory while access is removed from processor 12.

It will be appreciated that in accordance with this invention as hereinabove described access is given to either processor requesting it when requests appear one at a time and to the processor most recently having access when simultaneous requests are received. In this way, neither processor will be interrupted, during a transaction with memory, by a request from the other processor.

It is desirable to provide two modes of access to the memory, a first mode in which data is read into the memory from the processor or another device and the second mode wherein data is read out of the memory to the processor or the other device. The shared memory of FIG. 2 provides the necessary control to provide these two modes of access. It will be appreciated by those skilled in the art that the nature of electrical connection to memory 50 in order to accomplish the read and write operations is somewhat different. Particularly, data-out port 56 provides relatively low impedance signal sources, the logic levels of which determine the data supplied by memory 50. It will be appreciated therefore, that data-out port 56 must be isolated from the bus structure of the appropriate processor except when it is desired to read data from the memory. Data-in port 54 is adapted to receive data from the bus structure and is characterized by a relatively high impedance. It is, therefore, unnecessary during the time when a particular processor has access to the memory, to isolate port 54 while it is not actually in use. The distinction between data-in and data-out ports 54 and 56 may be more readily understood by considering that whenever data appears at port 56, it will essentially clamp the data bus to which it is connected to the data values in the particularly addressed memory location. Data-in bus 54, however, may be allowed to float since data will not be entered into memory except as determined by the signal applied to read/write port 58. Accordingly, data-out port 56 is connected to tri-state buffers 94 and 96 which are controlled by NAND gates 144 and 156, respectively. By way of example, and referring specifically now to NAND gate 144, it will be recalled that when processor 12 alone desires access to the memory, that a high signal is supplied to input 142 of NAND gate 144. It will be further recalled that output 168 of NAND gate 166 is low and it will be seen that this output is connected to input 191 of inverter 193 which provides a high input to input 194 of NAND gate 144. Output 196 of NAND gate 144 is connected to input 198 of tri-state buffer 94 which is energized to connect output terminal 98 to output terminal 56 of memory 50. Memory 50 is connected, therefore, to the output data bus only when an actual request for service is detected by NAND gate 102. It will be seen that tri-state buffers 86 and 88 remain actuated to connect the processor last receiving service to data-in port 54 of memory 50 even when no actual request for service is present. This is due to the flip-flop circuit arrangement of NAND gates 166 and 178. NAND gate 156 cooperates in a similar fashion with tri-state buffer 96 providing a low output signal from output 200 of NAND gate 156 to input 202 of tri-state buffer 96 whenever high signals are provided at inputs 204 and 154 of NAND gate 156. These signals are provided when AND gate 104 is activated by a request for service from processor 14 and further when NAND gate 178 provides a low signal at output 182 thereof which is inverted by inverter 206 to provide a high signal at output 208 thereof. Inputs 204 and 154 of NAND gate 156 both being high, output 200 thereof provides a low signal to activate tri-state buffer 96 and connect data-out port 56 to output 100 of tri-state buffer 96.

Read/write buses 24 and 24' are selectively connected to read/write port 58 of memory 50 by tri-state buffers 78 and 80. Buffers 78 and 80 are energized concurrently with buffers 62 and 64, respectively, and read/write buses 24 and 24' control the memory during those times when the corresponding address buses are connected to port 52 of memory 50.

Memory-enable port 60 is connected to output 210 of NOR gate 132, inputs 130 and 212 of which are connected to outputs 106 and 108 of AND gates 102 and 104, respectively. The memory is enabled by a high signal at output 210 of NOR gate 132 whenever either or both of AND gates 102 and 104 provides an output indicative of a request for service.

Figure 3:
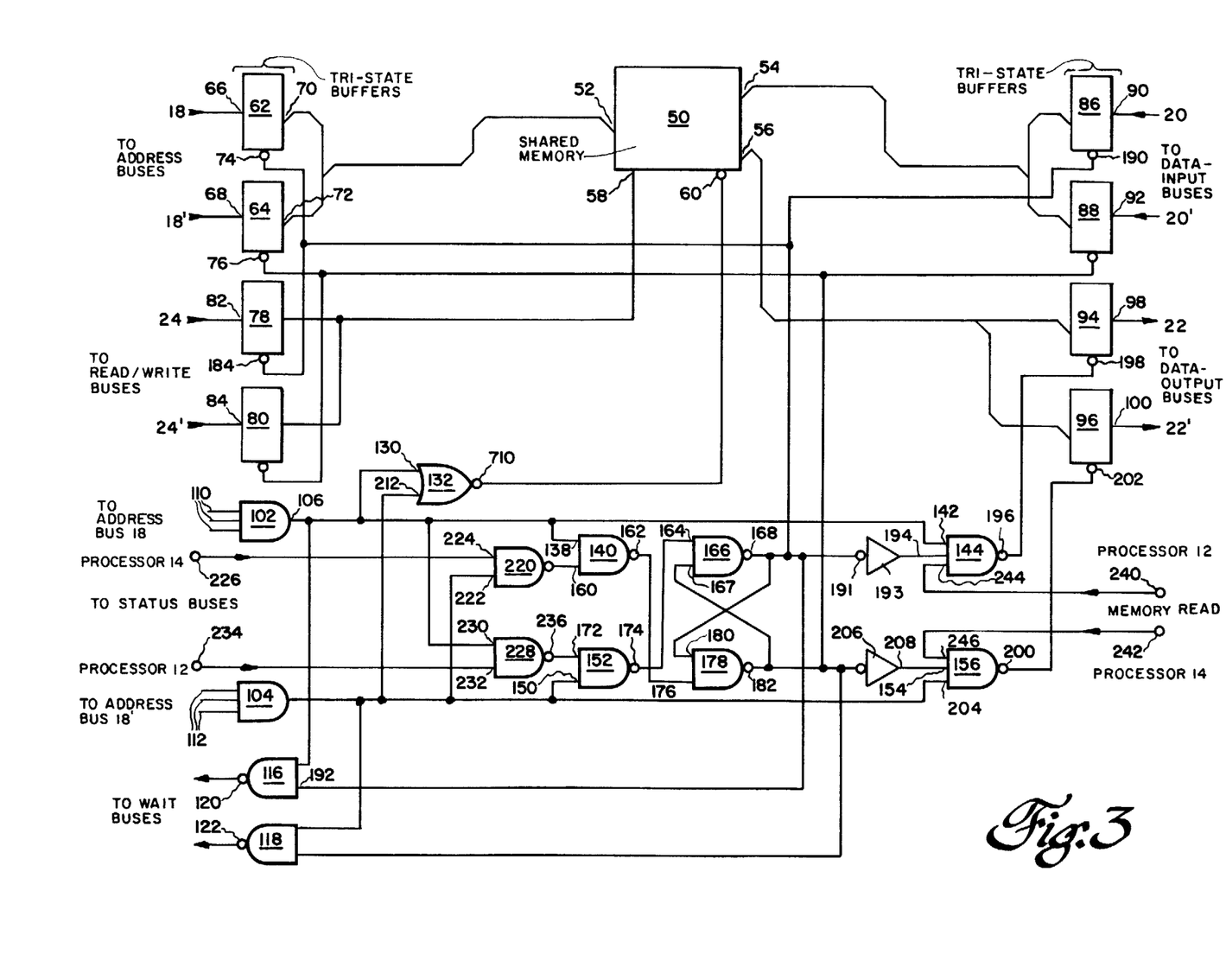
FIG. 3 is another detailed logical schematic diagram of a shared memory in accordance with this invention.

While the shared memory of FIG. 2 provides many advantages and will be readily appreciated by those skilled in the art to be quite widely applicable to any of a number of particular combinations of processors and memories commonly utilized, it is often times advantageous in accordance with this invention to provide certain specific additional features which substantially increase the efficiency of the shared memory. FIG. 3 illustrates a shared memory in accordance with this invention providing substantially all of the advnatages of the shared memory of FIG. 2 plus certain additional features. Referring specifically to FIG. 3 in which like reference numerals designate like elements with respect to FIG. 2, it will be seen that inverter 148 of FIG. 2 has been replaced by NAND gate 220 in FIG. 3. NAND gate 220 includes first input 222 which is connected to output 108 of AND gate 104 and second input 224 connected to input terminal 226. Inverter 136 is replaced by second NAND gate 228 which includes first and second terminals 230 and 232. Input 230 is connected to output 106 of AND gate 102 while input 232 is connected to input terminal 234. Input terminals 226 and 234 are adapted to be connected to the status busses of processors 14 and 12, respectively. The operation of the shared memory of FIG. 3 may be most readily understood by considering the nature of status information applied to inputs 226 and 234. It is emphasized that the following is exemplary, and while it applies to a particular microprocessor viz., an 8080 manufactured by Intel, other processors provide similar status information which may differ in form but which may be readily utilized by those skilled in the art by minor changes to the structure illustrated in FIG. 3. Status information indicates which of two states a microprocessor is in at a particular instant. These states are for convenience referred to as status and active states. During a status state, information is supplied at the data output port of a microprocessor indicative of the operation which will be accomplished during the succeeding active state. For example, read, write, input, output and interrupt operations may be indicated during the status period. Status and active microprocessor states occur in alternating fashion with the status state typically being somewhat shorter than the active state although this is not required in accordance with this invention. The signal applied to inputs 226 and 234 is a logic level signal having two conditions, a low condition during the status period and a high condition during the active period.

Three modes of operation are readily achievable by the shared memory structure of FIG. 3. In a first mode, one processor is chosen to have priority over the other. This is accomplished by connecting the input of the appropriate NAND gate 220 or 228 corresponding to the high priority processor permanently to a high logic signal. For example, assume that it is desired to give priority to processor 12. The NAND gate corresponding to processor 12 is NAND gate 228 and consequently input 234 is connected to a high logic level signal while input 226 is connected to the status output of processor 14. Since input 234 is permanently connected to a high logic level signal, whenever input 230 of NAND gate 228 is high, indicating a request for service by processor 12, a low signal will be produced at output 236 of NAND gate 228 and applied to input 172 of NAND gate 152. Input 226 is connected to the status output of processor 14 and since the status signal as hereinabove described changes alternately from a high to a low signal, it will be clear that when a request for service is present as indicated by a high signal at output 106 of AND gate 102, the flip-flop circuit comprising NAND gates 166 and 178 will be triggered during the next status period of processor 14 following a request for service by processor 12. On the other hand, assume that processor 12 has been for some time, and is requesting service. Since the status signal from processor 12 is not connected to NAND gate 228, but rather a permanently high logic signal is connected to input 232, processor 12 will retain connection to memory 50 so long as a service request is present at AND gate 102. A second mode of operation achieves equal priority by connecting both inputs 226 and 234 to a logic high signal. This mode of operation corresponds to the mode of operation of the embodiment of this invention illustrated in FIG. 2. It may be characterized as "lockout until done" operation and provides service to a processor so long as a request therefor is present.

A third and presently preferred system for assigning priority also gives equal priority to both processors but provides substantially increased efficiency of operation.

In this mode, status signals are applied to inputs 226 and 234 from the respective processors 14 and 12. Assuming that requests for service are present at both of AND gates 102 and 104 autosynchronous operation is achieved. Service is provided to each processor in turn so long as the status information therefrom indicates an active mode of operation. Service is switched to the other processor at the termination of the active mode and beginning of the status mode. In the particular case when the status and active modes are equal in length, synchronous operation will be achieved with memory service being provided alternately to the two processors during substantially 100% of the time. Where the status and active periods are of different lengths, presumably the status period being shorter, a certain amount of waiting time is necessary. It has been found that a shared memory in accordance with this invention provides nearly ideal memory utilization for processors of the type having alternating status and active periods and allows each processor to utilize the memory during the periods when it is not required by the other, thus eliminating what has heretofore been approximately 50% wasted time with respect to the memory. The shared memory of FIG. 3 includes another feature of this invention which will be useful in conjunction with certain specific embodiments hereof. Memory read inputs 240 and 242 are connected to additional inputs 244 and 246 of NAND gates 144 and 156. Certain microcomputer systems employ identical addresses for specific memory locations and also for input data locations. It is necessary that a memory for utilization in conjunction with a computer of this type provide means for distinguishing between memory addresses and input addresses. Memory read terminals 240 and 242 provide this function. Signals are applied to inputs 240 and 242 from processors 12 and 14, respectively, indicative of whether the address provided by the processor is a memory address or input address. A high logic signal applied to input 240 indicates that the address provided by the processor is a memory address while a low input to input 240 indicates that an input address is being provided. The signal applied to input 242 is identical but is derived from processor 14. It will be seen that the addition of memory read information increases the capability of a microcomputer system in accordance with this invention in that a smaller number of addresses and consequently a smaller number of address bits is required to provide access to both the memory and a large number of input devices. When a high logic level signal is provided at memory read input 240, for example, and further when a request for service is received at AND gate 102 providing a high signal at output 106 thereof which is applied to input 142 of NAND gate 144 and still further when a low signal is provided at output 168 of NAND gate 166 which low signal is inverted by inverter 193 and applied to input 194 of NAND gate 144 tri-state buffer 94 is activated by a low signal applied to input 198 thereof to connect data output 56 to output terminal 98 which is connected to the data-in bus of the microcomputer system. Tri-state buffer 96 is similarly actuated by the conjunctive existence of logical high signals at inputs 246, 204 and 154 of NAND gate 156. It will be seen that whenever either of memory read inputs 240 and 242 is low that tri-state buffers 94 and 96 cannot be actuated and outputs 98 and 100 thereof remain in a high impedance state and thus do not interfere with the acquisition of the data by the processor from the addressed input device.

It will be appreciated by those skilled in the art that either or both of the features of this invention illustrated at FIG. 3, viz. the assignment of priority through utilization of status information, and the increase in addressing capability through the use of memory read information, may be applied in accordance with this invention to a shared memory as illustrated herein. It is further emphasized that neither of these features is required and that neither depends upon the other.

Figure 4:
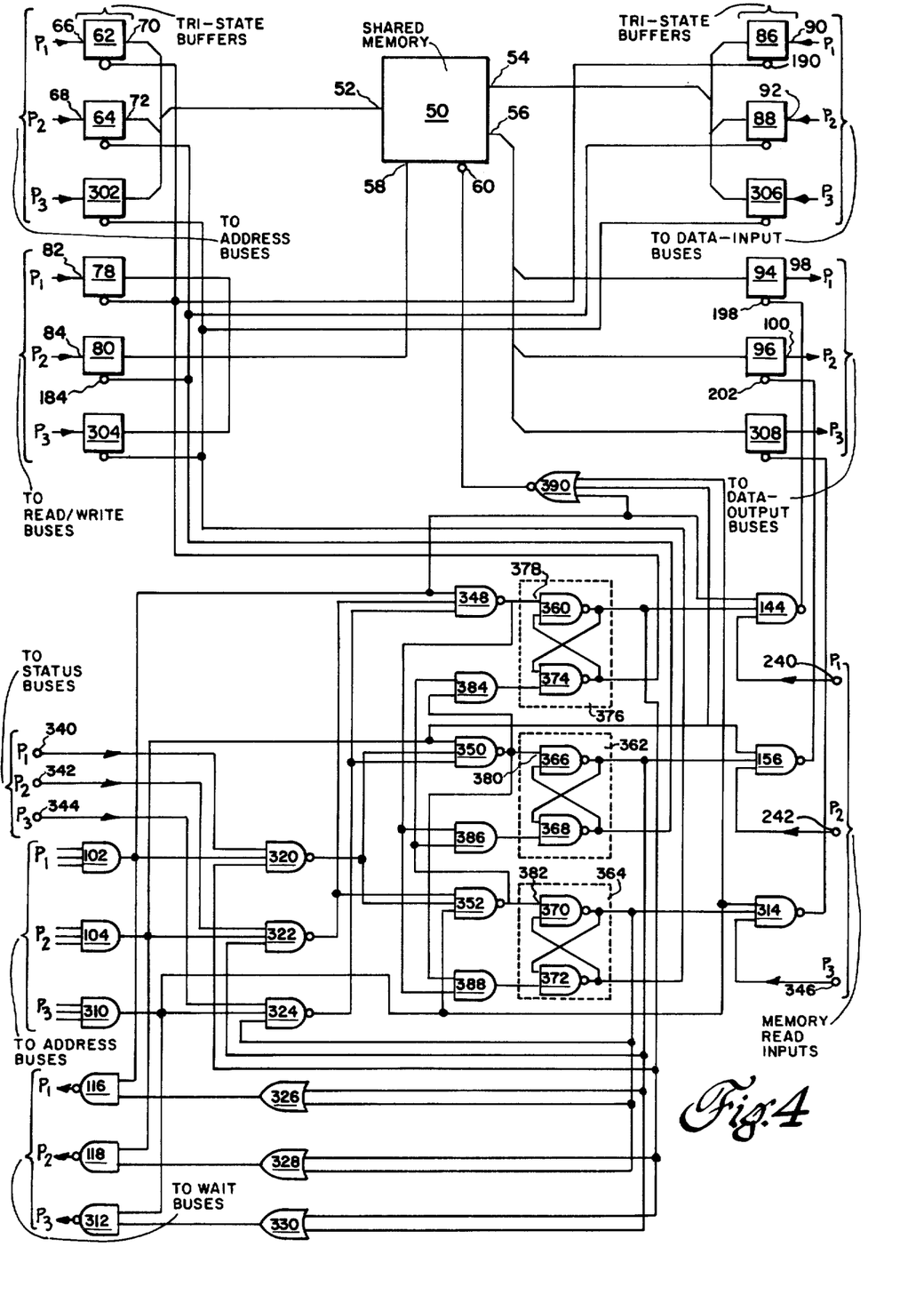
FIG. 4 is a detailed logical schematic diagram of a shared memory for use with more than two microprocessors in accordance with this invention.

A shared memory in accordance with this invention may readily be configured to provide the capability for sharing memory among three or more processors. FIG. 4 illustrates an embodiment of this invention wherein provision is made for connecting three processors to a single memory while retaining all the features and advantages of the shared memory of FIG. 3. The shared memory of FIG. 4 includes both the utilization of status information and the further utilization of memory read information hereinabove described in conjunction with the shared memory of FIG. 3. In FIG. 4, like reference numerals denote like elements with respect to FIGS. 2 and 3. The operation of the shared memory of FIG. 4 is substantially identical to that of FIG. 3 except for the addition of certain logical elements in order to provide for the simultaneous connection of the shared memory to three processors. Accordingly, FIG. 4 will be described in somewhat less detail than FIG. 3, the principles of operation thereof being equally applicable to FIG. 4. The distinctions between FIGS. 3 and 4 will, however, be clearly described hereinbelow.

The shared memory of FIG. 4 designated generally at 300, includes additional tri-state buffers 302, 304, 306 and 308 which provide selective connection to the address, read/write, data-in and data-out buses, respectively, of a third processor. Tri-state buffers 302, 304, 306 and 308 correspond and are substantially identical to the existing buffers which selectively connect the address, read/write, data-in and data-out buses of the first and second processors to memory 50. Shared memory 300 further includes additional AND gate 310 for connecting the high order address bits of the third processor to the shared memory, NAND gate 312 for connection to the wait bus of the third processor, and NAND gate 314 for connection to the memory read bus of the third processor. NAND gates 320, 322 and 324 are connected to the outputs of AND gates 102, 104 and 310 while OR gates 326, 328 and 330 are connected to NAND gates 116, 118 and 312, respectively, which provide wait signals to the three processors. Status signals are applied to inputs 340, 342 and 344 which are connected to NAND gates 320, 322 and 324, respectively.

The operation of shared memory 300 may be readily understood by considering several exemplary operating conditions. In order to simplify the discussion to follow, the microprocessors which are utilized in conjunction with shared memory 300 will be designated 1, 2 and 3. Microprocessor 1 is connected to tri-state buffers 62, 78, 86, and 94. It is further connected to AND gate 102, NAND gate 116, memory read input 240, and status input 340. Microprocessor number 2 is connected to tri-state buffers 64, 80, 88 and 96. Processor 2 is further connected to memory read-input 242, NAND gate 118, AND gate 104 and status input 342. Processor 3 is connected to tri-state buffers 302, 304, 306 and 308. It is further connected to memory read input 346, AND gate 310, NAND gate 312 and status input 344. Assume now that a request for service is indicated by application of high logic signals to the inputs of AND gate 102. Assume further that processors 2 and 3 do not require service and therefore that gates 104 and 310 provide low logic signals at the outputs thereof. High signals are supplied to NAND gate 320, NAND gate 348 and NAND gate 144. Input 340 will supply a high signal to NAND gate 320 when computer 1 is in the active mode and NAND gate 360 will supply a high signal to the last input of NAND gate 320 whenever processor 1 was the last processor having access to the memory. When all three inputs to NAND gate 320 are high, a low output will be produced thereby which low output is applied to NAND gate 350 and 352 thereby preventing either of flip-flops 362 or 364 from being set. For purposes of convenience, NAND gates 366 and 368 will be collectively referred to as flip-flop 362 while NAND gates 370 and 372 will be referred to as flip-flop 364. Similarly, NAND gates 360 and 374 comprise flip-flop 376. Each of these flip-flops is identical and is SET by applying a logical low signal to a first input of each of the flip-flops which input is input 378 in the case of flip-flop 376, 380 in the case of flip-flop 362 and 382 in the case of flip-flop 364. It will be seen that applying a zero to any of these inputs produces a one at the corresponding outputs of NAND gates 360, 366 and 370 when any of the flip-flops are SET and a low level signal is applied to the appropriate tri-state buffers associated with the corresponding processor. It will be understood that flip-flop 376 corresponds to processor 1, flip-flop 362 to processor 2 and flip-flop 364 to processor 3. It will be further understood that each flip-flop is RESET by the application of a low logic signal to the input of NAND gate 374, 368 or 372. Each of flip-flops 376, 362 and 364 will remain in either the SET or RESET condition indefinitely in the absence of additional signals thereto. AND gates 384, 386 and 388 provide the RESET signal to the flip-flop. Each of these AND gates includes two inputs, one input from each of NAND gates 348, 350 and 352 with which it is not associated. AND gate 384 is associated with NAND gate 348, AND gate 386 with NAND gate 350 and AND gate 388 with NAND gate 352. Therefore, for example, AND gate 384 has a first input from NAND gate 352 and a second input from NAND gate 350. It will be appreciated that whenever either of these inputs is zero, a zero will be produced at the output of AND gate 384 thus preventing flip-flop 376 from being SET. Therefore, whenever either of processors 2 or 3 has access to memory 50, processor 1 cannot gain access and interrupt the SET access. AND gates 386 and 388 are similarly connected. The ability of the shared memory of FIG. 4 to prevent the interruption of a transaction between a processor and memory prevents the premature interruption of a transaction with memory.

Memory 300 includes a system for determining which of two requests for memory will be accommodated. Consider, for example, that requests for service are received from processors 1 and 2 thus producing high logic level signals at the outputs of AND gates 102 and 104, respectively. Assume further that processor 2 last had access to memory 50 and that flip-flop 362 therefore is set producing a low output at the output of NAND gate 368 and a high output at the output of NAND gate 366. Assume further that flip-flops 376 and 364 are RESET producing low signals at the outputs of NAND gates 360 and 370. These low signals are applied to NAND gates 320 and 324, respectively, which provide high signals at the outputs thereof which high signals are connected to NAND gate 350. Since requests for service are received from processors 1 and 2 thus providing high signals at the outputs of AND gates 102 and 104, the outputs of NAND gates 320, 322 and 324 are high, low and high, respectively, assuming that the status signals applied to inputs 340, 342 and 344 are all high. NAND gate 322 provides low signals to NAND gates 348 and 352 thus inhibiting each of flip-flops 376 and 364 from being set and only flip-flop 362 can be SET. As has been described, all of the inputs to NAND gate 350 are high thereby producing a low output thereat which SETS flip-flop 362 and connects processor 2 to memory 50.

Those skilled in the art will appreciate that the status inputs applied to inputs 340, 342 and 344 become important only when simultaneous requests for service are present from two or more processors. When this is the case, access to memory is provided to a processor only so long as its status information indicates an active mode, and access is removed and supplied to the other processor when a status mode is indicated by the first processor.

The operation of NAND gates 144, 156 and 314 corresponds substantially to the corresponding gates in FIGS. 2 and 3. Each of the gates provides a low logic signal at the output thereof during the coincidence of: a memory read signal applied to inputs 240, 242 and 346; a request for service supplied from AND gates 102, 104 and 310 and a SET condition of flip-flops 376, 362 and 364. The operation of a multiprocessor shared memory utilizing a memory read signal was hereinabove described and will not be repeated. NOR gate 390 provides a low logic level memory enable signal whenever any of AND gates 102, 104 or 310 indicates a request for service by the presence of a high logic signal at the output thereof.

OR gates 326, 328 and 330 supply signals to NAND gates 116, 118 and 312, respectively, whenever any of flip-flops 376, 362 and 364 are SET. For example, OR gate 326 provides a high signal to NAND gate 116 whenever either of flip-flops 362 or 364 is SET. Similarly, OR gate 328 provides a high signal to NAND gate 116 whenever either of flip-flops 376 or 364 is SET. Further, OR gate 330 provides a high signal to NAND gate 312 whenever either of flip-flops 376 or 362 is SET. The coincidence of a high signal from one of OR gates 326, 328 and 330 with a request for service as indicated by a high signal from AND gates 102, 104 or 310 provides a wait signal at the output of one or more of NAND gates 116, 118 and 312 indicating to the appropriate processor that although service is requested, one of the other processors is currently utilizing the memory and, therefore, the requesting processor must wait.

Those skilled in the art will appreciate that under certain conditions simultaneous requests for service may be received from two processors neither of which was the last to have access to memory 50. While memory 300 will provide service to one of the requesting processors on a more or less random basis, it may be desirable to provide prioritized access. Accordingly, in accordance with this invention, it may be desirable to provide capacitors connected from the outputs of NAND gates 348, 350 and 352 to ground. These capacitors will provide a certain delay in response of NAND gates 348, 350 and 352 according to the size of the capacitor. In accordance with this invention, the microprocessor associated NAND gate which is desired to have the highest priority is provided with the smallest or no capacitor while the second priority processor associated NAND gate is provided with a somewhat larger capacitor and the final processor associated NAND gate is provided with a largest capacitor.

One skilled in the art will readily discern the nature of the response of shared memory 300 to a variety of requests for service conditions by reference to FIG. 4. It is, therefore, not deemed necessary to describe particular operating conditions in further detail. It will further be appreciated that reference to FIGS. 2–4 and the discussions corresponding thereto will enable one skilled in the art to expand, where desired, a shared memory in accordance with this invention to accommodate a larger number of processors than included in any of the examples herein.

A shared memory has been described in accordance with this invention which provides many advantages over prior art memories. Operation of a shared memory in accordance herewith is possible utilizing only the bus interconnected structures of a number of microcomputers without the need for further interconnections therebetween or control of one by the other. A shared memory in accordance with this invention provides increased efficiency, speed of operation and reliability without the need for modification with any of the microprocessors with which it is associated.

Many of the features hereinabove described in conjunction with the description of this invention provide unique solutions to a number of problems. For example, as has been described a shared memory in accordance with this invention may provide the appearance of different address locations to different processors. Further, means have been outlined to provide, in a simple and straight-forward way, a method for establishing priority between two or more processors. Synchronized operation through the utilization of status information supplied by two or more processors connected to a single shared memory in accordance with this invention is yet another feature provided herein. Applications of shared memories in accordance with this invention are limited only by the needs of the user. For example, in a simple two processor system, a first processor may be utilized to perform arithmetic operations on data while a second processor connected to the same shared memory with the first processor may be utilized to format the data for output in a usable form. This provides the advantage that the first processor may provide substantially realtime output data from a variety of inputs while the second processor accomplishes the formating of the output. Similarly, data may be transferred between processors in a more efficient manner than has been heretofore possible. The processor having the data may transfer to memory as the data is available and need not wait until the other processor is ready to receive it. Similarly, the receiving processor may read the data from memory at any time after it has been transferred and need not interrupt any operations occurring therein due to a need for simultaneous availability of two processors for transfer.

Shared memories in accordance with this invention may be utilized in a variety of ways to provide multiprocessor systems. For example, as has been hereinabove described multiple processors may be connected to a single memory or, in the alternative, memories and processors may be connected in a chain-type structure, a single processor being connected to two memories and each memory being connected to two processors, the connections between processors and memories being of the type illustrated in FIG. 1 where, for example, processor 14 is connected to a second shared memory which, in turn, is connected to a yet another processor in the manner shown and described.

While the invention has been particularly shown and described with reference to several preferred embodiments thereof, it will be understood by those skilled in the art that various changes in form and detail may be made therein without departing from the true spirit and scope of the invention as defined by the appended claims.

What is claimed is:

1. A microcomputer system of the type including at least two processors each configured to operate substantially independent of the remaining processors and each having an address bus, an input data bus and an output data bus, said system comprising:

a shared memory having an address bus, an input data bus and an output data bus for receiving on said input data bus into and, transmitting on said output data bus from, storage digital control, program and data information from and to any one of said processors; and a single control means connected to said memory and to each of said substantially independent processors for selectively connecting the respective address, input data and output data buses of said memory to the respective address, input data and output data buses of a selected one of said processors in response to a request for memory access received by said control means from said processors, said control means including at least first, second and third sets of buffers respectively for connecting the address, input data and output data buses of said memory to the corresponding address, input data and output data buses of a selected processor sending a request for memory access; means for recognizing predetermined patterns of address bits appearing at said single control means on said address buses of said at least two processors for generating one of a plurality of logic signals each associated with a corresponding processor addressing said memory; and means receiving the logic signals from said address bits recognizing means for enabling said first, second and third sets of buffers to connect the buses of said memory to the associated busses of the requesting processor if a single memory access request is received by said control means and for enabling said first, second and third sets of buffers to connect the buses of said memory to the associated buses of the last processor previously having access to said memory, at any time prior to the present request for access and without consideration of the length of time any other processor has been waiting for access to said memory, if a request for memory access is received by said address bits recognizing means substantially simultaneously from each of at least two of said processors, after an access to said memory by one of said processors is completed.

2. A multiple processor microcomputer comprising:
a first processor having an address bus, an input data bus and an output data bus;
a second processor having an address bus, an input data bus and an output data bus;
a shared memory having an address bus, an input data bus and an output data bus; and a single control means connected to said address bus, said input data bus and said output data bus of said first processor; and to said address bus, said input data bus and said output data bus of said second processor; and to said address bus, said input data bus and said output data bus of said shared memory for connecting each of said buses of said memory to the corresponding ones of said buses of a selected one of said first and second processors selected in response to predetermined patterns of address bits appearing at said control means on said address buses of said first and second processors, said control means connecting the address, input data and output data buses of said memory to the corresponding address, input data and output data buses of that one processor sending address bits requesting access to said memory only if one request for memory access is received by said control means, and said control means connecting the address, input data and output data buses of said memory to the corresponding address, input data and output data buses of the last processor to have received access to said memory, at anytime prior to the present requests for access, if requests for access to said memory are substantially simultaneously received from both of said first and second processors after an access to said memory by one of said processors is completed.

3. The multiple processor microcomputer of claim 2, further comprising means connected to said memory and to said address buses of said first and second processors for causing said memory to appear to each of said processors to include different memory addresses.

4. The multiple processor microcomputer of claim 2, wherein said memory comprises random access memory.

5. The multiple processor microcomputer of claim 4, further comprising means for prioritizing access to said memory to allow a selected one of said first and second processors to temporarily selectively gain access to said memory on a priority basis with respect to the other of said first and second processors, when both of said first and second processors substantially simultaneously request access to said memory while said memory is not being otherwise accessed by either processor.

6. The multiple processor microcomputer of claim 4, wherein said control means includes buffer means for selectively connecting the address, input data and output data buses of said memory to the corresponding address, input data and output data buses of only that one processor selected by said control means for connection to said memory at any particular time.

7. The multiple processor microcomputer of claim 2, wherein each of said first and second processors issues a status signal indicative of the capability of the associated processor to send data to, and receive data from, said memory; said microcomputer further including means responsive to said status signals from said first and second processors for providing synchronized access of one of said processors to said memory, only if said one of said processors requests access to said memory and also provides the associated status signal to said status signal responsive means.

8. The multiple processor microcomputer of claim 2, wherein said control means includes first and second flip-flop circuits respectively associated with said first and second processors, each of said first and second flip-flop circuits being SET by the appearance of said predetermined pattern of address bits on the address bus respectively from said first and second processors and corresponding to memory addresses in said memory and being RESET by the appearance of the predetermined patterns of address bits on the address bus respectively from the second and first processors and corresponding to memory addresses in said memory; and means for inhibiting said first and second flip-flop circuits from being SET or RESET whenever memory address bit patterns corresponding to memory addresses in said memory appear substantially simultaneously on both said address buses of said first and second processors.

9. The multiple processor microcomputer of claim 8, further comprising:

a first status bus originating in said first processor;

a second status bus originating in said second processor;

said first and second status buses carrying first and second status signals respectively, said first and second status signals being indicative of each of said first and second processors being in one of a status mode and an active mode; and means connected to said first and second status buses for allowing one of said flip-flop circuits to be SET or RESET by the associated one of said first and second processors when the other of said first and second processors is in the status mode.

* * * * *